US006276583B1

(12) United States Patent
Tourneur

(10) Patent No.: US 6,276,583 B1
(45) Date of Patent: Aug. 21, 2001

(54) ARRANGEMENT FOR TRANSPORTING GOLF BAGS AND THE LIKE WITHIN A MOTOR VEHICLE

(75) Inventor: Kevin Tourneur, West Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/426,166

(22) Filed: Oct. 22, 1999

Related U.S. Application Data
(60) Provisional application No. 60/105,975, filed on Oct. 28, 1998.

(51) Int. Cl.[7] ................................................. B60R 11/00
(52) U.S. Cl. ........................................ 224/542; 224/539
(58) Field of Search ..................................... 224/542, 539, 224/925; 280/DIG. 5, DIG. 6; 248/96

(56) References Cited

U.S. PATENT DOCUMENTS

| 5,316,358 | 5/1994 | Payne et al. . | |
| 5,484,091 | * 1/1996 | Malinowski et al. | 224/542 |
| 5,713,502 | * 2/1998 | Dixon | 224/542 |
| 5,829,655 | * 11/1998 | Salopek | 224/542 X |

* cited by examiner

Primary Examiner—Gregory M. Vidovich
Assistant Examiner—Maerena W. Brevard
(74) Attorney, Agent, or Firm—Mark P. Calcaterra

(57) ABSTRACT

An arrangement for transporting a plurality of golf bags within a motor vehicle. The motor vehicle has a rear storage area partially defined by first and second laterally spaced apart sides. The arrangement includes a lower mounting member and an upper mounting member. The lower mounting member is removably attached to the motor vehicle. The lower mounting member includes a corresponding plurality of recesses. Each of the plurality of recesses is adapted for receiving a lower end of one of the plurality of golf bags and is defined by a generally planar surface and an arcuate surface. The generally planar surface is angled from the horizontal and generally perpendicular to the arcuate surface. The upper mounting member includes a first end and a second end. The arrangement further includes first and second attachment members secured to the first and second laterally spaced apart sides. The first and second attachment members both define a generally upwardly facing opening removably receiving the first and second ends of the upper mounting member, respectively. The upper mounting member is forwardly spaced from the lower mounting member.

13 Claims, 5 Drawing Sheets

US 6,276,583 B1

ARRANGEMENT FOR TRANSPORTING GOLF BAGS AND THE LIKE WITHIN A MOTOR VEHICLE

CROSS-REFERENCE TO RELATED APPLICATION

This application is based on a provisional patent application which has been assigned U.S. Ser. No. 60/105,975 (filed Oct. 28, 1998).

BACKGROUND OF THE INVENTION

1. Technical Field

The present invention generally pertains to motor vehicles. More particular, the present invention pertains to an arrangement for transporting golf bags and the like within a motor vehicle. More specifically, but without restriction to the particular embodiment and/or use which is shown and described for purposes of illustration, the present invention relates to a method and apparatus for transporting golf bags within a rear storage area of a minivan, sport utility vehicle or the like in a generally upright or vertical orientation.

2. Discussion

In motor vehicles such as minivans, sport utility vehicles and the like, it has become common practice to provide the vehicle body with a large rear opening. A liftgate (also referred to as a tailgate) is typically mounted to the vehicle body with hinges for pivotal movement about a transversely extending axis between an open position and a closed position. The rear opening provides access to a rear storage area.

When multiple golf bags are transported in such vehicles, they are horizontally laid on the floor and stacked upon one another. This arrangement disadvantageously results in excessive jostling of the golf clubs and consumes considerable space within the rear storage area. In addition, golf clubs are often partially or completely displaced from their golf bag during transportation.

It remains desirable to provide an arrangement for securely transporting a plurality of golf bags within a motor vehicle in a generally upright or vertical orientation which minimizes the storage space consumed and protects the golf clubs from damage.

SUMMARY OF THE INVENTION

It is a general object of the present invention to provide an improved arrangement for transporting golf bags and the like within a motor vehicle.

In one form, the present invention provides an arrangement for transporting a plurality of golf bags within a motor vehicle. The motor vehicle has a rear storage area partially defined by first and second laterally spaced apart sides. The arrangement includes a lower mounting member and an upper mounting member. The lower mounting member is removably attached to the motor vehicle. The lower mounting member includes a corresponding plurality of recesses. Each of the plurality of recesses is adapted for receiving a lower end of one of the plurality of golf bags and is defined by a generally planar surface and an arcuate surface. The generally planar surface is angled from the horizontal and generally perpendicular to the arcuate surface. The upper mounting member includes a first end and a second end. The arrangement further includes first and second attachment members secured to the first and second laterally spaced apart sides. The first and second attachment members both define a generally upwardly facing opening removably receiving the first and second ends of the upper mounting member, respectively. The upper mounting member is forwardly spaced from the lower mounting member.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
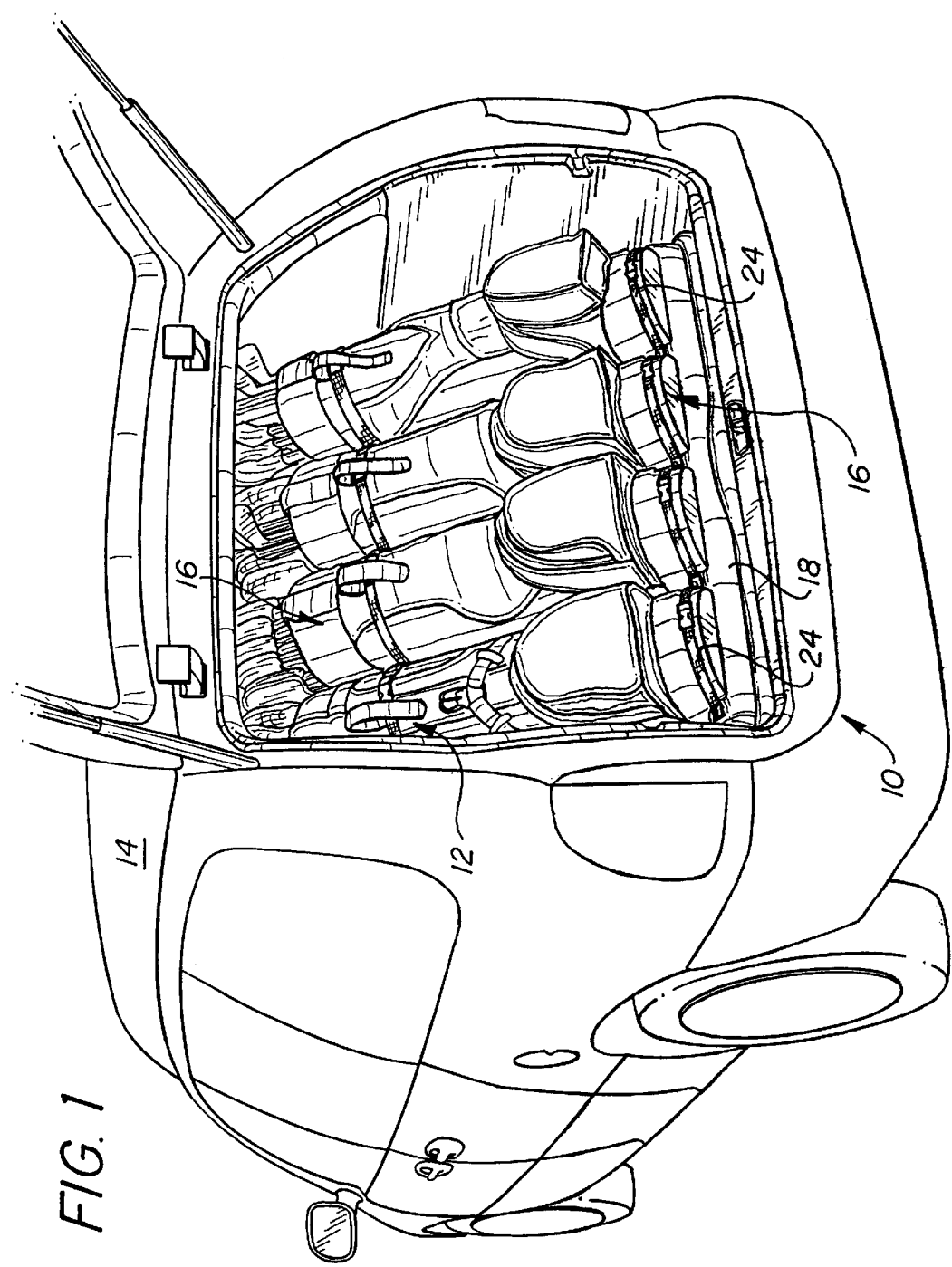
FIG. 1 is a perspective view of an arrangement for transporting golf bags within a motor vehicle constructed in accordance with the teachings of a preferred embodiment of the present invention and shown operatively associated with a plurality of golf bags and an exemplary motor vehicle.
Figure 2:
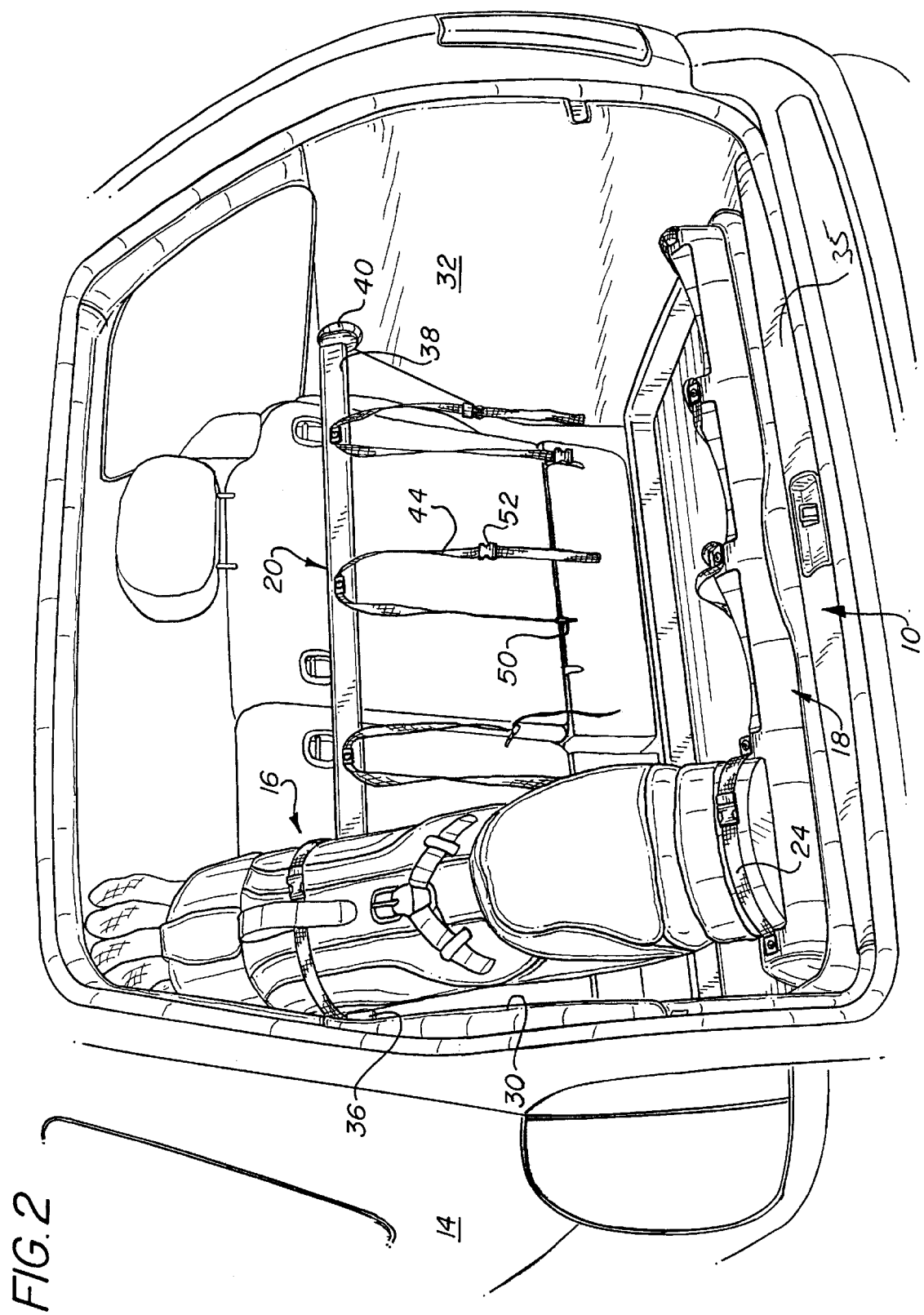
FIG. 2 is a perspective view similar to FIG. 1 shown with all but one of the golf bags removed for purposes of illustration.
Figure 3:
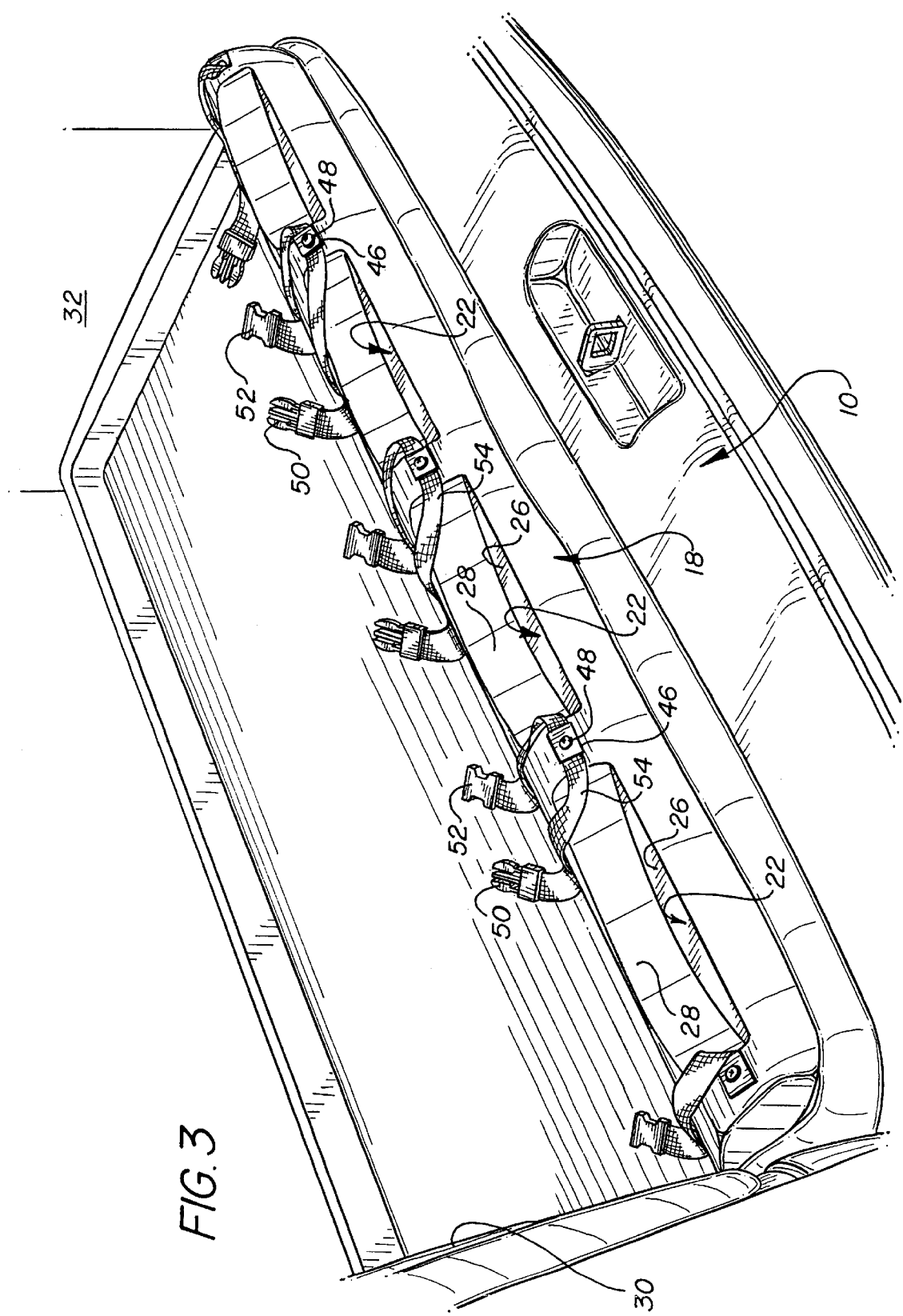
FIG. 3 is an enlarged perspective view further illustrating a lower mounting member of the arrangement of the present invention.
Figure 4:
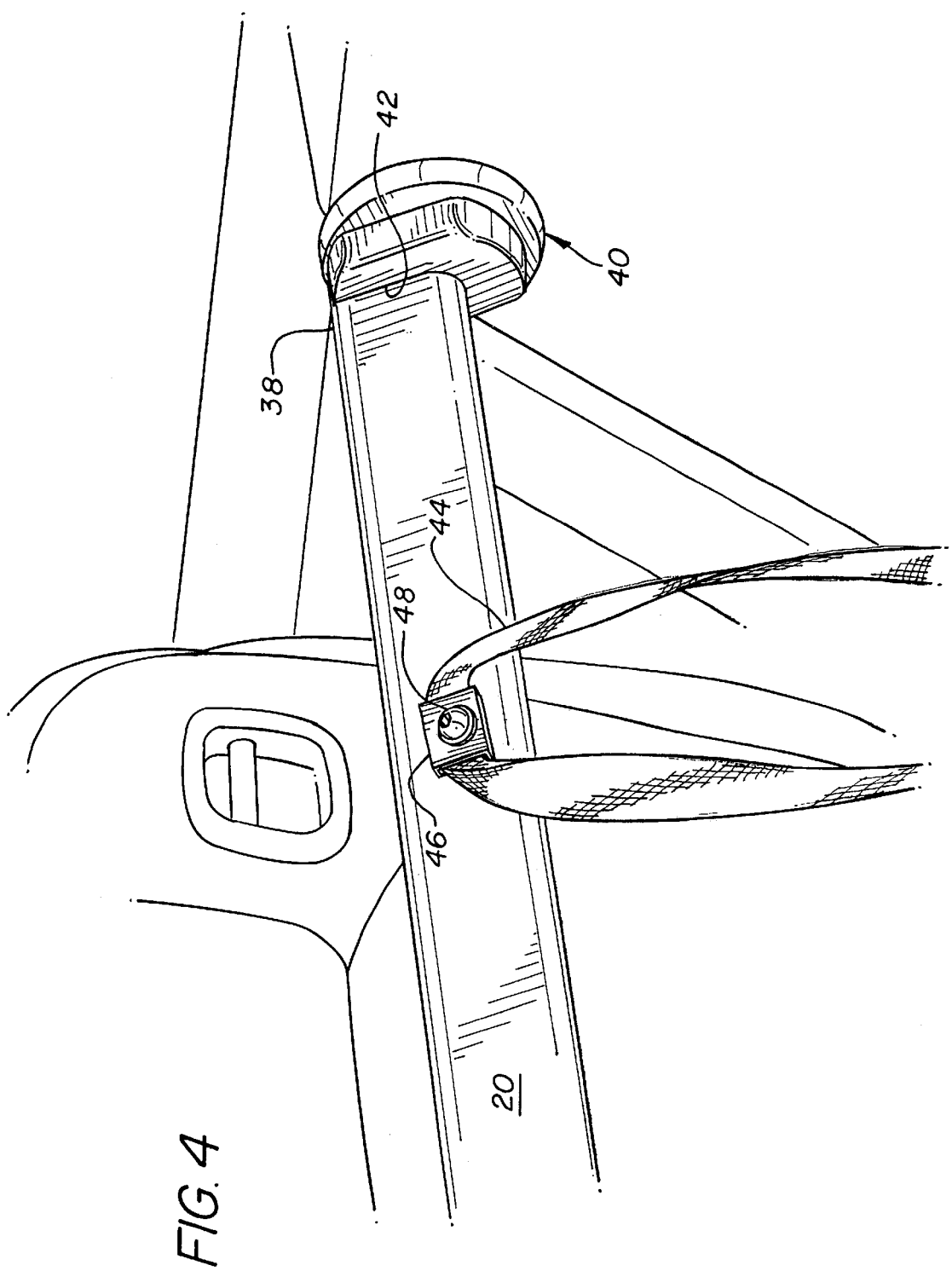
FIG. 4 is an enlarged perspective view further illustrating an upper mounting member of the arrangement of the present invention and its releasable attachment to the motor vehicle.
Figure 5:
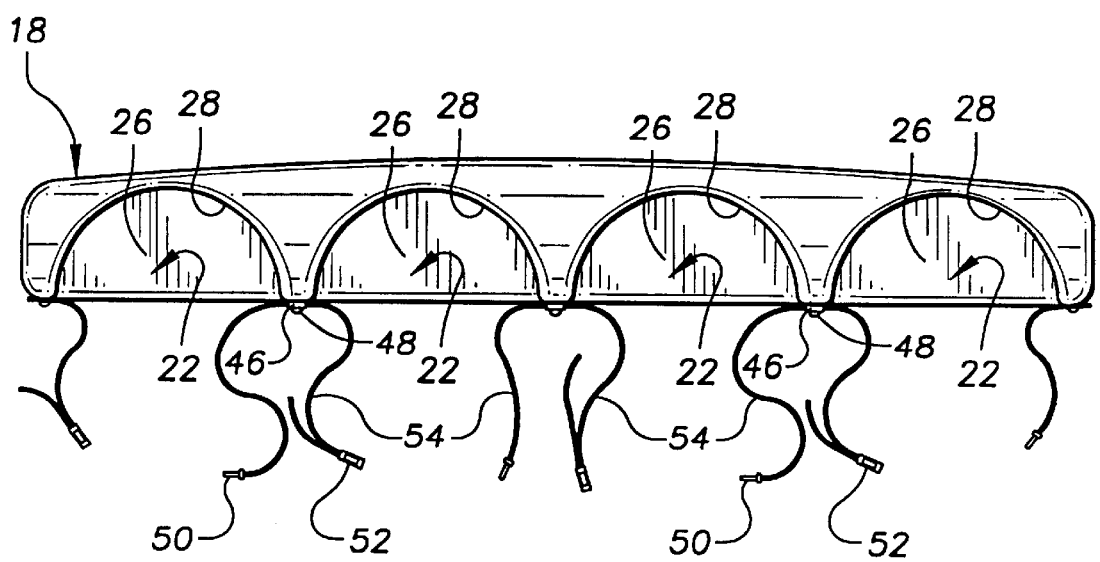
FIG. 5 is a top view of the lower mounting member of the arrangement for transporting golf bags of the present invention.
Figure 6:
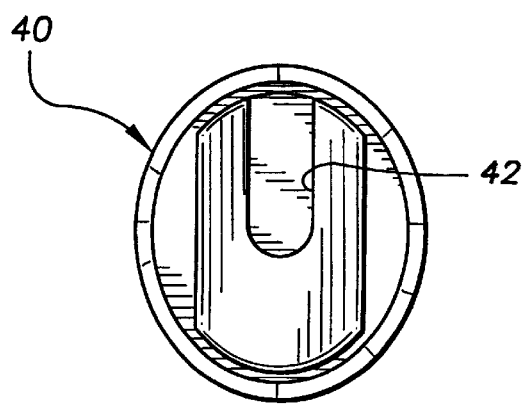
FIG. 6 is a side view of the attachment member of the upper mounting member of the present invention.

With initial reference to the environmental view of FIG. 1, an arrangement for transporting golf bags and the like within a motor vehicle constructed in accordance with a preferred embodiment of the present invention is generally identified with reference numeral 10. The arrangement 10 is shown operatively mounted within a rear storage area 12 of a motor vehicle 14. The arrangement 10 is further shown operatively associated with a plurality of golf bags 16. In the exemplary embodiment, the vehicle illustrated is a minivan, particularly of the type manufactured and sold by Daimler-Chrysler Corporation. It will be understood that the teachings of the present invention are also applicable for other types of motor vehicles including but not limited to sport utility vehicles, pick up trucks and the like.

With continued reference to FIG. 1 and additional reference to FIGS. 2 through 6, the arrangement of the present invention is shown to generally include a lower mounting member 18 and an upper member 20. The lower and upper mounting members 18 and 20 cooperate to secure the plurality of golf bags 16 within the motor vehicle 14 for transportation. The lower mounting member 18 is illustrated to define a plurality of recesses 22. In the exemplary embodiment, the lower mounting member defines four recesses 22. However, the particular number of recesses 22 is strictly a matter of design choice which is subject to modification within the scope of the present invention.

Each of the recesses 22 is adapted to partially receive and support a lower end 24 of one of the plurality of golf bags. Each recess 22 is defined by a generally planar surface 26 and an arcuate surface 28. In the exemplary embodiment illustrated, the generally planar surfaces 26 are in the shape of a half-circle and are angled from the horizontal. In one embodiment, the generally planar surfaces 26 are oriented at an angle between approximately 25 and 30 degrees. The generally planar surfaces 26 are oriented generally perpendicular to an associated arcuate surface 28.

While not specifically shown, it will be understood that the lower mounting member 18 preferably extends laterally across the rear storage area 12 of the vehicle 14 and is removably mounted within the vehicle 14. Such removable attachment can be accomplished by any manner well known in the art. For example, the lower mounting member may be merely supported on a floor of the rear storage area 12. In such an arrangement, a rear lip 35 would oppose rearward movement of the lower mounting member 18. Alternatively, laterally opposing ends of the lower mounting member 18 can be received into slots provided the laterally opposing sides 30 and 32 of the vehicle 14 or fasteners can be used for securement to the floor pan 34.

The upper mounting member 20 is elongated in a transverse direction and includes a first end 36 and a second end 38. The upper mounting member 20 has a generally U-shaped cross section and is removably interconnected to the laterally opposing sides 30 and 32 through a pair of substantially identical attachment members 40. The attachment members 40, only one of which is shown in the drawings, are fixedly secured to the first and second laterally opposed sides 30 and 32 with suitable fasteners (not shown) and both define a generally U-shaped slot 42 for receiving the upper mounting member 20. The U-shaped slots 42 open in a generally upwardly facing direction. In the exemplary embodiment illustrated, the slots 42 are angled at approximately 25 to 30 degrees from the vertical.

To provide means for securing an upper end of the golf bags 16 to the upper mounting member 20, the arrangement 10 of the present invention further includes a corresponding first set of straps 44. The straps 44 correspond in number to the recesses 22 of the lower mounting member 18. Each of the straps 44 is securely fastened at approximately its midpoint to the upper mounting member 20 with a bracket 46 and a threaded fastener 48. First and second cooperating latch components 50 and 52, which are conventional in construction, are carried at or near the ends of the straps 44.

To provide means for securing the lower end 24 of the golf bags 16 to the lower mounting member 18, the arrangement 10 of the present invention further includes a second set of straps 54. Three straps of the second set of straps 54 are identical in construction and disposed between adjacent pairs of recesses 22. As with the first set of straps 44, these three straps 54 are securely fastened at approximately their midpoints to the lower mounting member 18 with a bracket 46 and a threaded fastener 48. Again, first and second cooperating latch components 50 and 52 of conventional construction are carried at or near the ends of the straps 54. As the golf bags 16 are shown positioned interbetween adjacent straps 54, of a first latch component 50 of one of the straps 54 cooperates with a second latch component 52 of an adjacent strap 54. The straps 54 located at opposing ends of the lower mounting member 18 need only be provided with one of the first and second latching components 50 and 52.

In use, a golf bag 16 is introduced into the rear storage area 12 of the vehicle 14 generally horizontally with the upper end of the golf bag 16 leading. After the upper end clears the rear opening, the upper end is raised so that the golf bag 16 is generally vertical. The lower end 24 of the golf bag 16 is placed in and supported by one of the recesses 52, while the upper end of the golf bag 16 rests against the upper mounting member 20. In the embodiment illustrated, the upper mounting member 20 is positioned forward of the lower mounting member 18 and the golf bags 16 are supported in the vehicle 14 so as to angle forward slightly. However, it will be understood that alternatively the golf bags may be oriented such that the bags 16 are vertically oriented or angled slightly rearward. Once the golf bag 16 is properly positioned, it may then be secured to the lower and upper mounting members 18 and 20 with the straps 54 and 44, respectively.

Thus, it will now be appreciated that the present invention provides an improved arrangement for transporting a plurality of golf bags in a motor vehicle. The arrangement consumes a limited amount of space when not in use and can be removed from the vehicle if desired. Substantially vertical transportation of the golf bags 16 facilitates loading and unloading and reduces jostling of the clubs therein.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In a motor vehicle having a rear storage area partially defined by first and second laterally spaced apart sides, an arrangement for transporting a golf bag therein, the arrangement comprising:
   a lower mounting member disposed adjacent to a floor of the motor vehicle, said lower mounting member defining at least one recess sized to receive a lower end of the golf bag;
   said recess defined by a generally planar surface and an arcuate surface, said generally planar surface being angled from the horizontal and generally perpendicular to the arcuate surface.

2. The arrangement for transporting a golf bag of claim 1, wherein said recess has a substantially half-circle shape.

3. The arrangement for transporting a golf bag of claim 2, wherein said lower mounting member is directly supported on the floor of the motor vehicle.

4. The arrangement for transporting a golf bag of claim 1, further comprising an upper mounting member defining at least one recess sized to receive an upper end of the golf bag.

5. The arrangement for transporting a golf bag of claim 4, wherein, said upper mounting member is forwardly spaced from said lower mounting member.

6. The arrangement for transporting a golf bag of claim 4, further comprising first and second attachment members secured to the first and second laterally spaced apart sides, respectively, said first and second attachment members both defining a generally upwardly facing opening removably receiving first and second ends of said upper mounting member, respectively.

7. In a motor vehicle having a rear storage area partially defined by first and second laterally spaced apart sides, an arrangement for transporting a plurality of golf bags therein, the arrangement comprising:

a lower mounting member disposed adjacent to a floor of the motor vehicle, said lower mounting member including a corresponding plurality of recesses each sized to receive a lower end of one of the plurality of golf bags;

wherein each recess of said plurality of recesses is defined by a generally planar surface and an arcuate surface, said generally planar surface being angled from the horizontal and generally perpendicular to the arcuate surface.

8. The arrangement for transporting a plurality of golf bags of claim 7, wherein each recess has a substantially half-circle shape.

9. The arrangement for transporting a plurality of golf bags of claim 7, wherein said lower mounting member is directly supported on the floor of the motor vehicle.

10. The arrangement for transporting a plurality of golf bags of claim 7, further comprising an upper mounting member defining at least one recess sized to receive an upper end of the golf bag.

11. The arrangement for transporting a plurality of golf bags of claim 10, wherein, said upper mounting member is forwardly spaced from said lower mounting member.

12. The arrangement for transporting a plurality of golf bags of claim 10, further comprising first and second attachment members secured to the first and second laterally spaced apart sides, respectively, said first and second attachment members both defining a generally upwardly facing opening removably receiving first and second ends of said upper mounting member, respectively.

13. In a motor vehicle having a rear storage area partially defined by first and second laterally spaced apart sides, an arrangement for transporting a plurality of golf bags therein, the arrangement comprising:

a lower mounting member removably attached to the motor vehicle, said lower mounting member including a corresponding plurality of recesses for receiving a lower end of each of the plurality of golf bags, each recess of said plurality of recesses defined by a generally planar surface and an arcuate surface, said generally planar surface being angled from the horizontal and generally perpendicular to the arcuate surface;

an upper mounting member including a first end and a second end; and first and second attachment members secured to the first and second laterally spaced apart sides, respectively, said first and second attachment members both defining a generally upwardly facing opening removably receiving said first and second ends of said upper mounting member, respectively;

said upper mounting member being forwardly spaced from said lower mounting member.

* * * * *